United States Patent
Shie (10) Patent No.: US 12,465,201 B2
(45) Date of Patent: Nov. 11, 2025

(54) ENDOSCOPE

(71) Applicant: Chang-bih Shie, Tainan (CN)

(72) Inventor: Chang-bih Shie, Tainan (CN)

(*) Notice: Subject to any disclaimer, the term of this patent is extended or adjusted under 35 U.S.C. 154(b) by 0 days.

(21) Appl. No.: 18/038,816

(22) PCT Filed: Jan. 27, 2022

(86) PCT No.: PCT/IB2022/050700
§ 371 (c)(1),
(2) Date: May 25, 2023

(87) PCT Pub. No.: WO2022/162566
PCT Pub. Date: Aug. 4, 2022

(65) Prior Publication Data
US 2024/0090752 A1    Mar. 21, 2024

(30) Foreign Application Priority Data

Jan. 29, 2021  (TW) ................................ 110103510

(51) Int. Cl.
*A61B 1/005* (2006.01)
*A61B 1/00* (2006.01)
(Continued)

(52) U.S. Cl.
CPC .......... *A61B 1/0055* (2013.01); *A61B 1/0052* (2013.01); *A61B 1/015* (2013.01);
(Continued)

(58) Field of Classification Search
CPC ..... A61B 1/005; A61B 1/0051; A61B 1/0052; A61B 1/0053; A61B 1/0055;
(Continued)

(56) References Cited

U.S. PATENT DOCUMENTS 4,329,980 A * 5/1982 Terada ................. A61B 1/0055
                                                          600/140
4,790,624 A * 12/1988 Van Hoye ............... F03G 7/062
                                                          600/151
(Continued)

FOREIGN PATENT DOCUMENTS

CN     110200576 A     9/2019
CN     111920366 A     11/2020
(Continued)

OTHER PUBLICATIONS

Taiwanese Office Action dated Sep. 16, 2021, for Chang-bih Shie, Taiwanese Patent Application No. 110103510, filed Jan. 29, 2021.

*Primary Examiner* — Ryan N Henderson
(74) *Attorney, Agent, or Firm* — Law Offices of Albert Wai-Kit Chan, PLLC (57) ABSTRACT

An endoscope (100) includes an insertion tube device (2) and a control device (8). The insertion tube device (2) includes an elastic support unit (3), a lens unit (4), and a tubular sleeve unit (7). The elastic support unit (3) includes a distal disk (31), a proximal disk (33), an intermediate disk (32), first and second springs (34, 35) respectively connected between the disks (31, 32, 33). The lens unit (4) includes a lens seat (41) and a lens module (42). The tubular sleeve unit (7) is sleeved on the lens seat (41) and the elastic support unit (3). The control device (8) includes a grip (81), and an angulation control module (85) connected to the insertion tube device (2). The angulation control module (85) is operable to move the distal disk (31) and to deflect the first spring (34), thereby controlling angle of the distal disk (31).

11 Claims, 10 Drawing Sheets

(51) Int. Cl.
*A61B 1/015* (2006.01)
*A61B 1/06* (2006.01)
*A61B 1/12* (2006.01)

(52) U.S. Cl.
CPC ............ *A61B 1/0615* (2013.01); *A61B 1/126* (2013.01); *A61B 1/00096* (2013.01); *A61B 1/00114* (2013.01)

(58) Field of Classification Search
CPC ... A61B 1/0056; A61B 1/0057; A61B 1/0058; A61B 1/008; A61B 1/00071; A61B 1/00077; A61B 1/05; A61B 1/051; A61B 1/053; A61B 2017/00314; A61M 25/0133; A61M 25/0136; A61M 25/0138; A61M 25/0141
See application file for complete search history.

(56) References Cited

U.S. PATENT DOCUMENTS

| | | | | |
|---|---|---|---|---|
| 4,836,189 | A * | 6/1989 | Allred, III | A61B 1/303 600/156 |
| 4,873,965 | A * | 10/1989 | Danieli | G02B 23/2476 600/152 |
| 4,930,494 | A * | 6/1990 | Takehana | F03G 7/06143 600/145 |
| 4,987,314 | A * | 1/1991 | Gotanda | A61B 1/0058 337/140 |
| 4,989,581 | A * | 2/1991 | Tamburrino | A61B 1/0055 600/103 |
| 5,002,041 | A * | 3/1991 | Chikama | A61M 25/0138 600/146 |
| 5,203,380 | A * | 4/1993 | Chikama | A61B 1/0057 138/121 |
| 5,255,668 | A * | 10/1993 | Umeda | A61M 25/0147 604/528 |
| 5,810,717 | A * | 9/1998 | Maeda | A61B 1/0055 600/151 |
| 6,485,409 | B1 * | 11/2002 | Voloshin | A61B 1/31 600/101 |
| 6,542,230 | B1 * | 4/2003 | Luke | B23K 26/0884 356/241.1 |
| 7,056,283 | B2 * | 6/2006 | Baror | A61B 1/00151 600/114 |
| 8,777,843 | B2 * | 7/2014 | Banju | A61B 1/0055 606/1 |
| 9,186,049 | B2 * | 11/2015 | Lee | A61B 1/0055 |
| 2002/0177750 | A1 * | 11/2002 | Pilvisto | A61B 1/00071 600/146 |
| 2003/0065250 | A1 * | 4/2003 | Chiel | A61B 34/72 600/115 |
| 2006/0111617 | A1 * | 5/2006 | Wimmer | A61B 1/0055 600/149 |
| 2007/0185384 | A1 * | 8/2007 | Bayer | A61B 1/00177 600/129 |
| 2008/0027285 | A1 * | 1/2008 | Yasunaga | A61B 1/0058 600/150 |
| 2008/0234545 | A1 * | 9/2008 | Breedveld | A61B 17/29 600/104 |
| 2009/0326326 | A1 * | 12/2009 | Lin | A61B 1/00071 600/146 |
| 2010/0036202 | A1 * | 2/2010 | Lin | G02B 23/2476 600/146 |
| 2010/0099949 | A1 * | 4/2010 | Tilson | A61B 1/0055 600/116 |
| 2010/0113875 | A1 * | 5/2010 | Yi | A61B 1/0055 600/101 |
| 2011/0060186 | A1 * | 3/2011 | Tilson | A61B 1/01 600/104 |
| 2012/0229615 | A1 * | 9/2012 | Kirma | A61B 5/0086 348/E7.085 |
| 2013/0144126 | A1 * | 6/2013 | Iede | A61B 1/00117 600/139 |
| 2013/0331651 | A1 * | 12/2013 | Iede | A61B 1/00078 600/140 |
| 2014/0066952 | A1 * | 3/2014 | Kappel | A61M 25/0138 403/53 |
| 2014/0118515 | A1 * | 5/2014 | Lee | A61B 1/0055 348/65 |
| 2014/0188081 | A1 * | 7/2014 | Saito | A61B 1/00073 604/525 |
| 2014/0243592 | A1 * | 8/2014 | Kato | A61B 17/00234 600/141 |
| 2015/0141756 | A1 * | 5/2015 | Cheng | B25J 18/06 604/95.04 |
| 2016/0249788 | A1 * | 9/2016 | Saito | A61M 25/0053 600/140 |
| 2017/0215712 | A1 * | 8/2017 | Hoshi | A61B 1/00078 |
| 2017/0254447 | A1 * | 9/2017 | Saito | A61M 25/0053 |
| 2017/0265720 | A1 * | 9/2017 | Saito | A61M 25/0054 |
| 2018/0206706 | A1 * | 7/2018 | Wang | A61B 1/005 |
| 2019/0082934 | A1 * | 3/2019 | Matsunaga | A61B 1/00078 |
| 2019/0343374 | A1 | 11/2019 | Shibuya et al. | |
| 2020/0015657 | A1 * | 1/2020 | Garbin | A61M 25/0084 |
| 2020/0054198 | A1 * | 2/2020 | Tseng | A61B 1/018 |
| 2020/0257105 | A1 * | 8/2020 | Okita | A61B 1/0055 |
| 2020/0323600 | A1 * | 10/2020 | Kurokawa | A61B 1/0055 |
| 2020/0383557 | A1 * | 12/2020 | Sedlacek | A61B 1/005 |
| 2020/0390315 | A1 * | 12/2020 | Nakamura | G02B 23/24 |
| 2021/0085155 | A1 * | 3/2021 | Kugo | A61B 1/0058 |
| 2021/0127950 | A1 * | 5/2021 | Akui | A61B 1/0057 |
| 2021/0161367 | A1 * | 6/2021 | Akui | A61B 1/00078 |
| 2021/0330174 | A1 * | 10/2021 | Yang | B33Y 10/00 |
| 2022/0087505 | A1 * | 3/2022 | Hirata | G02B 23/24 |
| 2022/0265127 | A1 * | 8/2022 | Tilson | A61B 1/0051 |
| 2023/0405844 | A1 * | 12/2023 | Hirata | A61B 1/0055 |
| 2024/0189981 | A1 * | 6/2024 | Hirata | B25J 9/104 |

FOREIGN PATENT DOCUMENTS

| | | |
|---|---|---|
| CN | 112244949 A | 1/2021 |
| TW | 201944956 A | 12/2019 |
| TW | 201943380 A | 8/2022 |
| WO | 2020/048979 A1 | 3/2020 |

* cited by examiner

ENDOSCOPE

FIELD

The disclosure relates to a medical instrument, and more particularly to an endoscope.

BACKGROUND

Endoscopes are used to perform a variety of medical investigations such as intestinal examinations, bronchial examinations, abdominal examinations, and thoracic cavity examinations. A conventional endoscope includes a fiberscope or a videoscope that is inserted into an internal cavity of a patient (including humans and animals) to capture images of organs or other tissues of the patient. Some endoscopes have a highly complex structure for obtaining clear images or for performing some surgical procedures, and it results in a higher production cost of the endoscope. For the sake of cost saving, endoscopes are commonly reused after sterilization.

However, when an endoscope is used for a patient who suffers from a highly communicable disease such as AIDS and COVID-19, sterilization procedure on the endoscope may be time-consuming and very costly because it must be performed more thoroughly to a higher safety standard. On the other hand, cost concerns may be raised when using a single-use endoscope.

SUMMARY

Therefore, an object of the disclosure is to provide an endoscope that can alleviate at least one of the drawbacks associated with the abovementioned prior art.

According to the disclosure, the endoscope includes an insertion tube device and a control device. The insertion tube device includes an elastic support unit, a lens unit, and a tubular sleeve unit. The elastic support unit includes a distal disk, a proximal disk, an intermediate disk disposed between the distal disk and the proximal disk, a first spring being deflectable and connected between the distal disk and the intermediate disk, and a second spring being deflectable and connected between the intermediate disk and the proximal disk. The distal disk, the first spring, the intermediate disk, the second spring, and the proximal disk are arranged coaxially with each other when the first and second springs are not deflected. The distal disk has front and rear surfaces. The rear surface of the distal disk faces toward the first spring. The lens unit includes a lens seat mounted on the front surface of the distal disk, and a first lens module mounted on the lens seat for capturing images. The tubular sleeve unit is sleeved on the lens seat and the elastic support unit. The control device includes a grip that is connected to the proximal disk of the elastic support unit, an angulation control module that is installed on the grip and that is connected to the insertion tube device, and a signal wire module that is mounted on the grip and that is electrically connected to the first lens module for signal and power transmission. The angulation control module is operable to move the distal disk relative to the intermediate disk and to deflect the first spring, thereby controlling angle of the distal disk relative to the intermediate disk.

BRIEF DESCRIPTION OF THE DRAWINGS

Other features and advantages of the disclosure will become apparent in the following detailed description of the embodiments with reference to the accompanying drawings, of which:

FIG. 6 is a fragmentary, partly exploded perspective view illustrating the embodiment;

DETAILED DESCRIPTION

Figure 1:
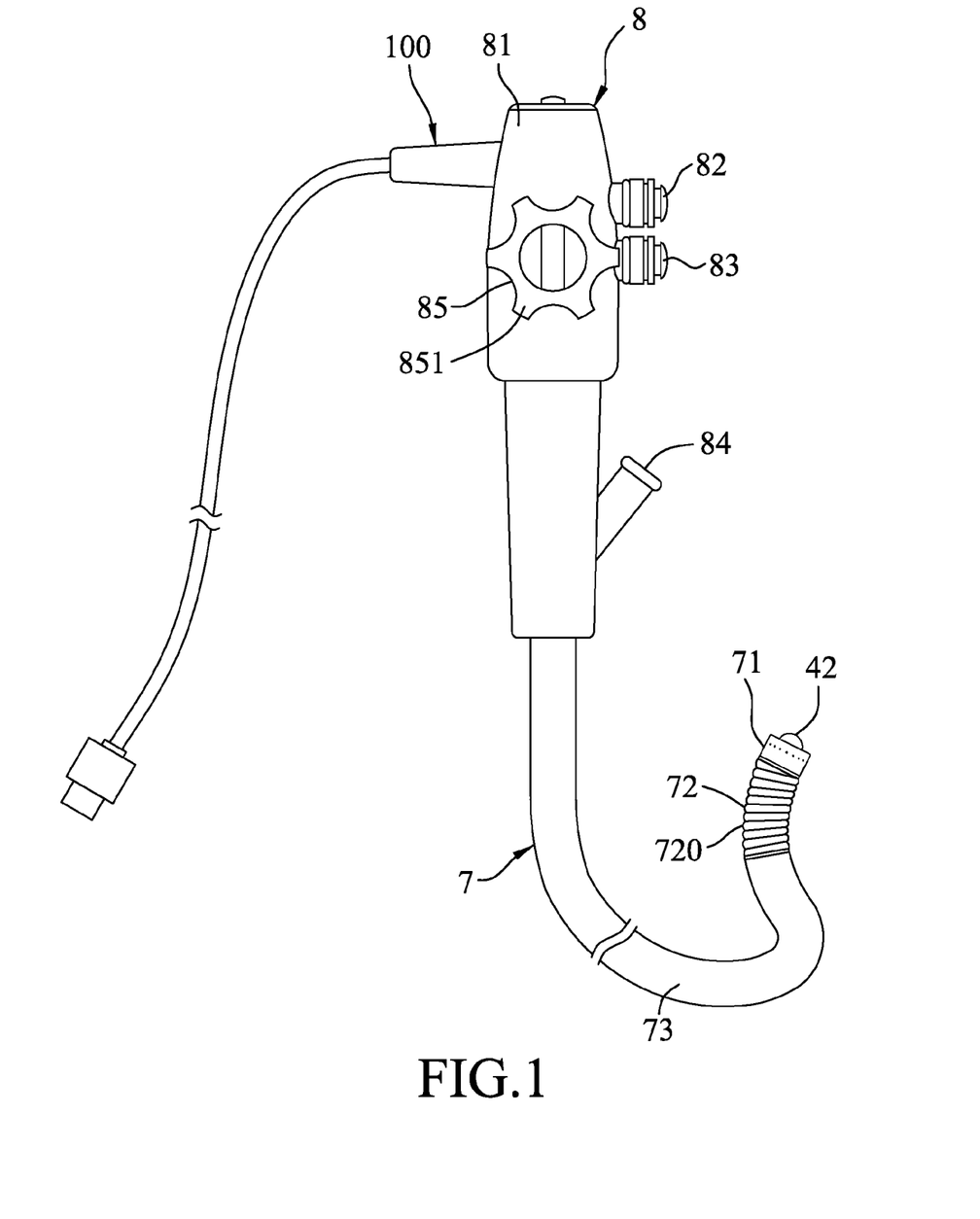
FIG. 1 is a fragmentary side view illustrating an embodiment of an endoscope according to the disclosure.

Referring to FIG. 1, an embodiment of an endoscope 100 according to the disclosure includes an insertion tube device 2 that is flexible and that is for insertion into an internal cavity of a patient, and a control device 8 that is connected to an end of the insertion tube device 2.

Figure 2:
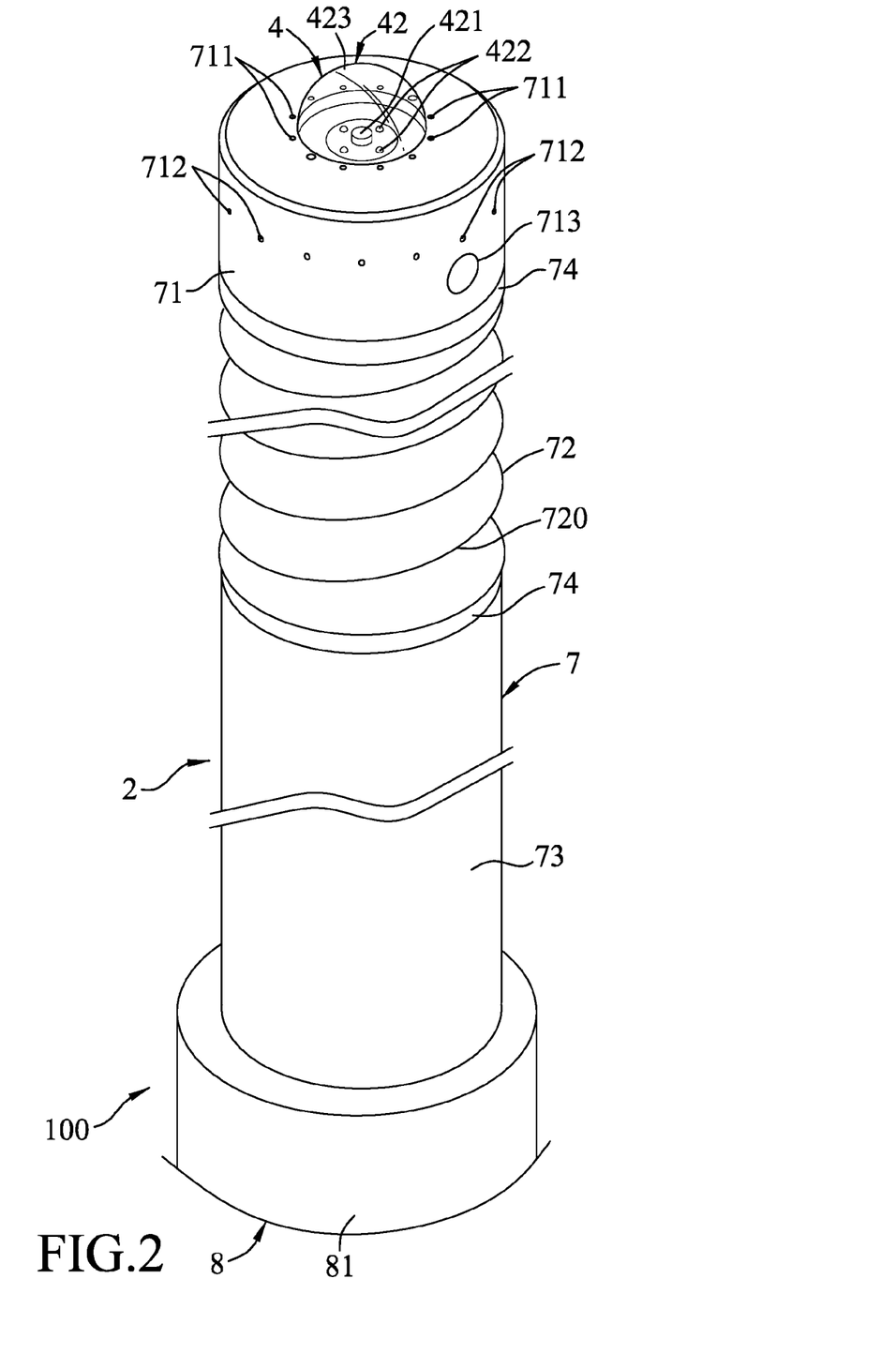
FIG. 2 is a fragmentary perspective view illustrating an insertion tube device of the embodiment.
Figure 3:
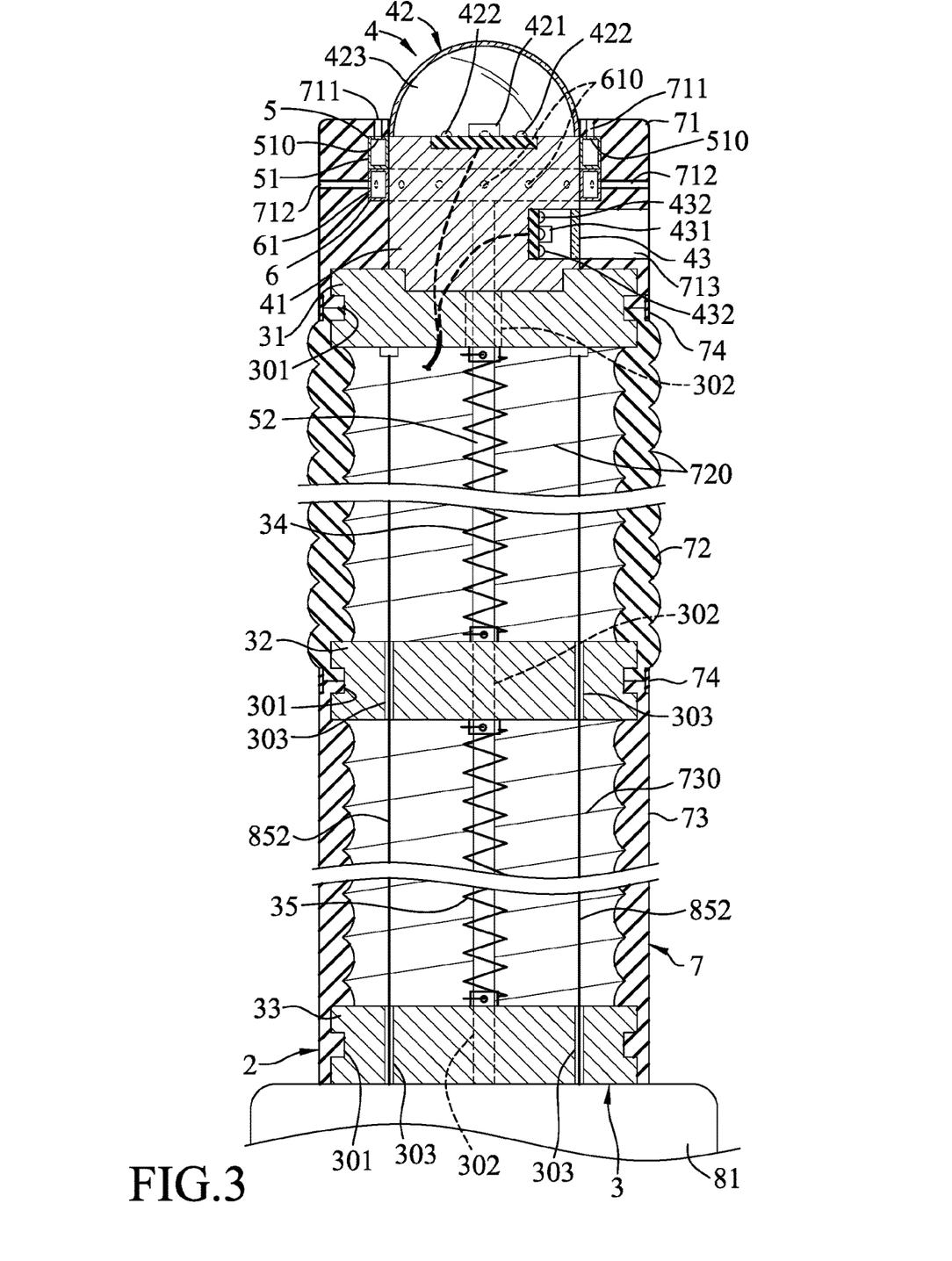
FIG. 3 is a fragmentary sectional side view illustrating the insertion tube device of the embodiment.
Figure 4:
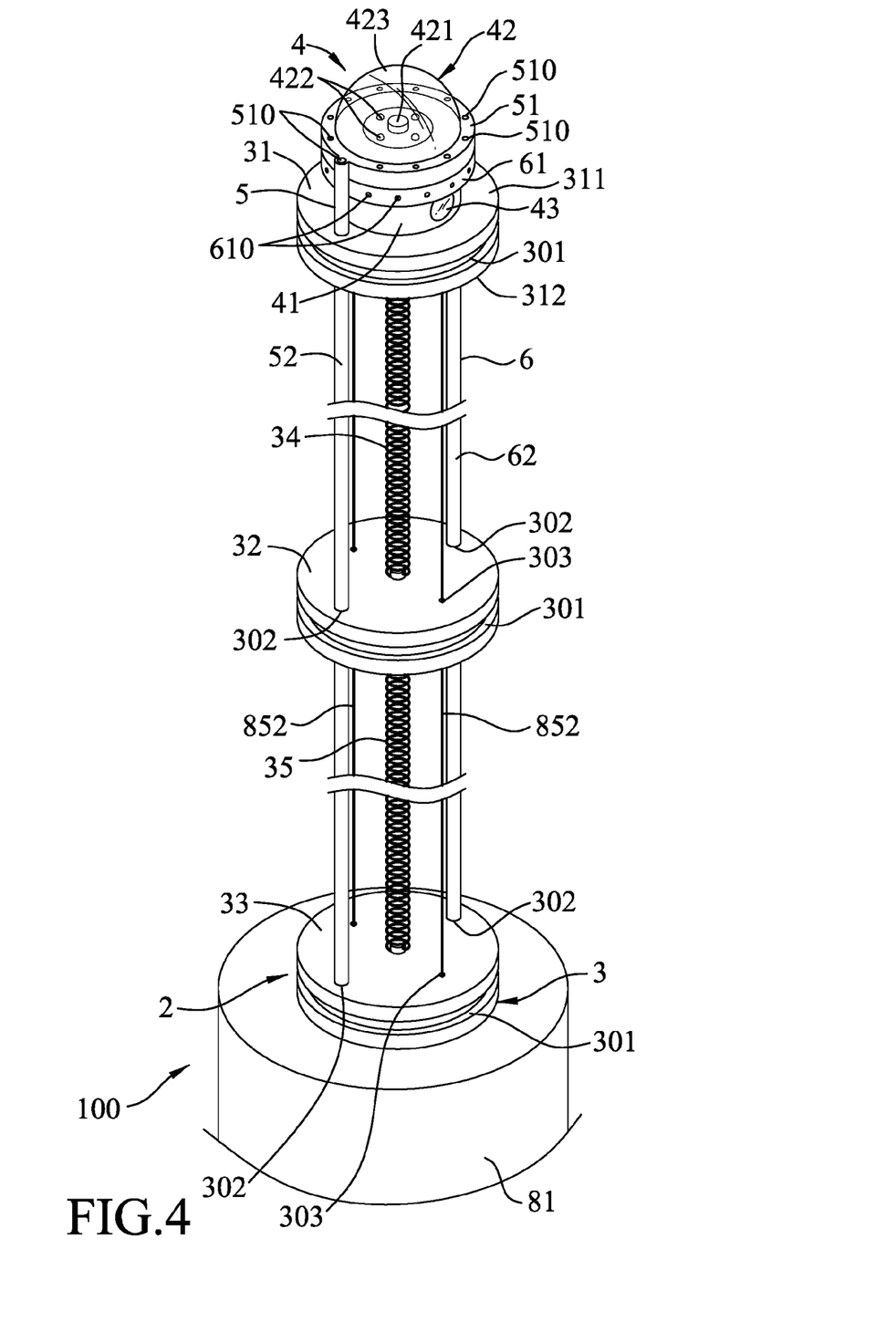
FIG. 4 is a fragmentary perspective view illustrating the insertion tube device of the embodiment with a tubular sleeve unit of the insertion tube device being omitted.

Referring to FIGS. 2, 3, and 4, the insertion tube device 2 includes an elastic support unit 3, a lens unit 4, a nozzle unit 5, a suction unit 6, and a tubular sleeve unit 7.

Figure 5:
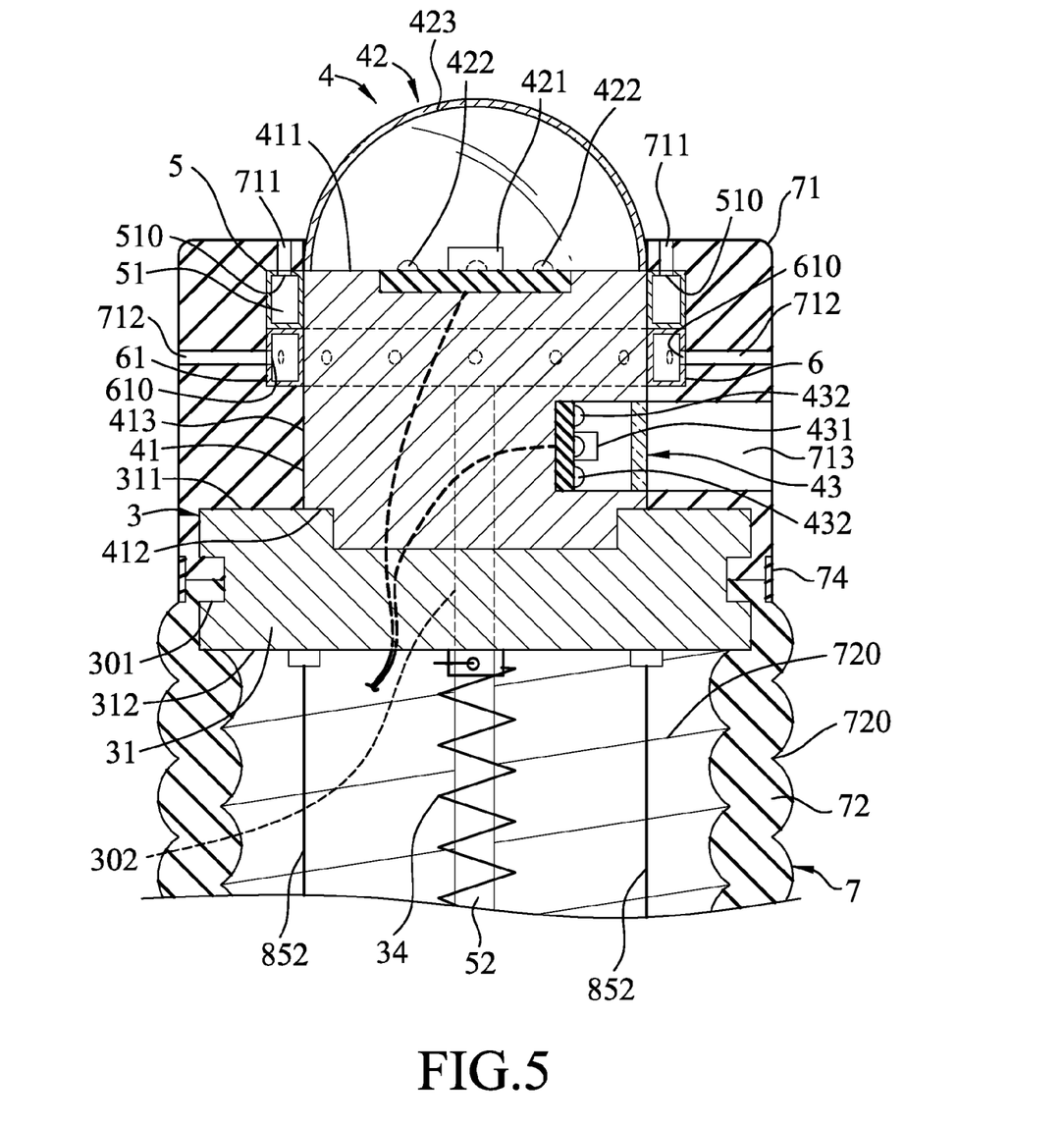
FIG. 5 is a fragmentary enlarged view of FIG. 3.

The elastic support member 3 includes a distal disk 31, a proximal disk 33, an intermediate disk 32 disposed between the distal disk 31 and the proximal disk 33, a first spring 34 being deflectable and connected between the distal disk 31 and the intermediate disk 32, and a second spring 35 being deflectable and connected between the intermediate disk 32 and the proximal disk 33. The distal disk 31, the first spring 34, the intermediate disk 32, the second spring 35, and the proximal disk 33 are arranged coaxially with each other when the first and second springs 34, 35 are not deflected. Referring further to FIG. 5, the distal disk 31 has front and rear surfaces 311, 312. The rear surface 312 of the distal disk 31 faces toward the first spring 34.

Figure 6:
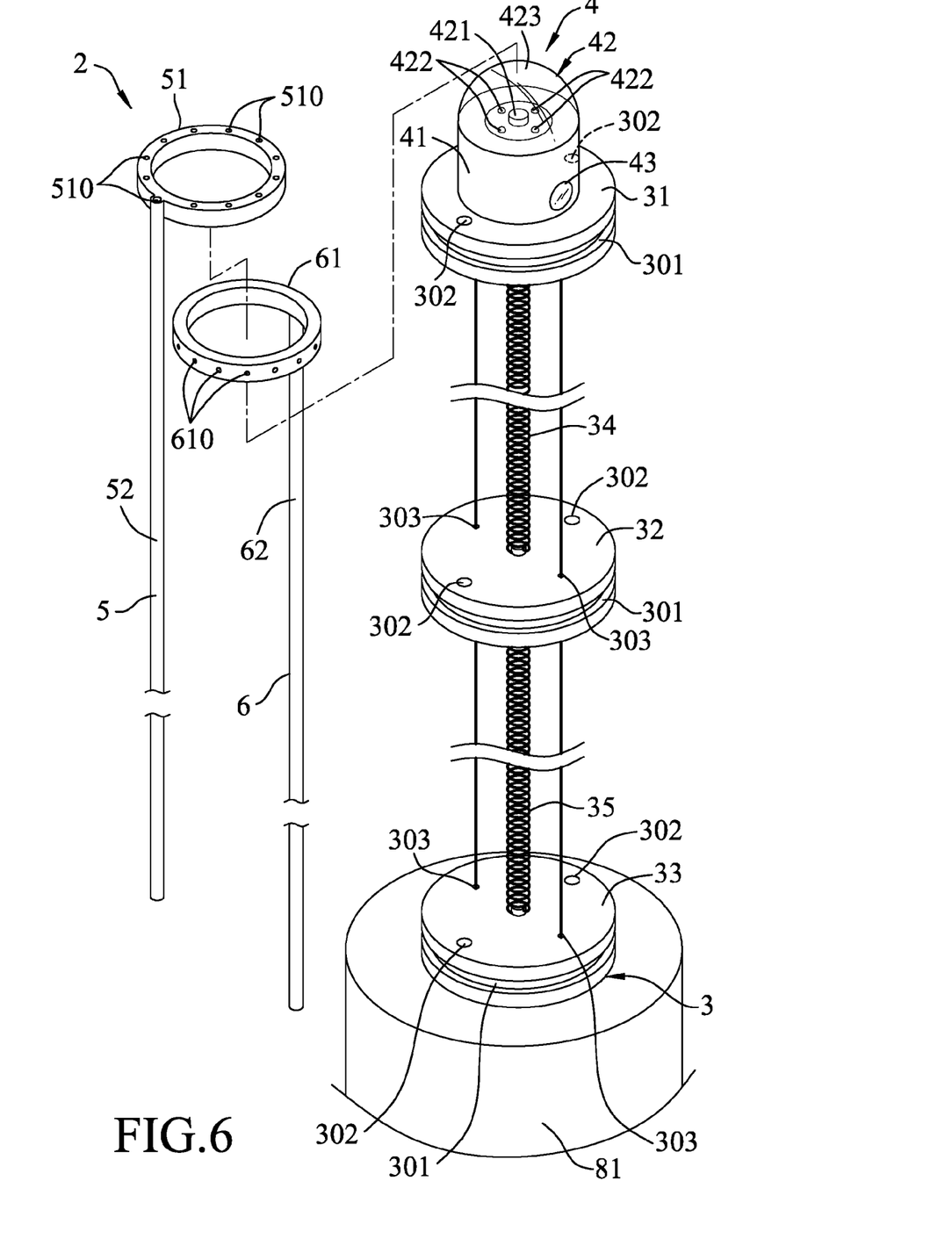

Each of the distal disk 31, the intermediate disk 32, and the proximal disk 33 has an outer periphery that is formed with a circular groove 301 extending around the outer periphery. Referring further to FIG. 6, the distal disk 31 has two conduit passage holes 302 that extend parallel to a central axis of the distal disk 31, and that are respectively disposed at opposite sides of the first spring 34. The intermediate disk 32 has two conduit passage holes 302 that extend parallel to the central axis of the intermediate disk 32, and that are respectively disposed at opposite sides of the first and second springs 34, 35. The intermediate disk 32 further has two wire passage holes 303 that extend parallel to the central axis of the intermediate disk 32, and that are respectively disposed at opposite sides of the first and second springs 34, 35. The proximal disk 33 has two conduit passage holes 302 that extend parallel to the central axis of the proximal disk 33, and that are respectively disposed at opposite sides of the second spring 35. The proximal disk 33 further has two wire passage holes 303 that extend parallel to the central axis of the proximal disk 33, and that are respectively disposed at opposite sides of the second spring 35.

In this embodiment, the first and second springs 34, 35 are coil springs that bendably support the distal disk 31 and the intermediate disk 32. The first spring 35 has an elastic coefficient greater than that of the second spring 35, so that the first spring 34 is easier to deflect than the second spring 35.

Referring to FIGS. 2, 3, and 5, the lens unit 4 includes a lens seat 41, a first lens module 42, and second lens module 43. The lens seat 41 is mounted on the front surface 311 of the distal disk 31, and has a front surface 411, a rear surface 412 opposite to the front surface 411 and being in contact with the front surface 311 of the distal disk 31, and a side surface 413 interconnecting the front and rear surfaces 411, 412. The first lens module 42 is mounted on the front surface 411 of the lens seat 41. The second lens module 43 is embedded into the lens seat 41 via the side surface 413 of the lens seat 41.

Particularly, the first lens module 42 includes a front lens 421 that is for capturing front view images, a plurality of front illumination members 422 that are disposed around the front lens 421 for illuminating an area ahead of the front lens 421, and a transparent cover member 423 that is mounted on the lens seat 41 and that covers the front lens 421 and the front illumination member 422. The second lens module 43 includes a side lens 431 that is for capturing side view images, and a plurality of side illumination members 432 that are disposed around the side lens 43 for illuminating an area around the side lens 431.

Figure 7:
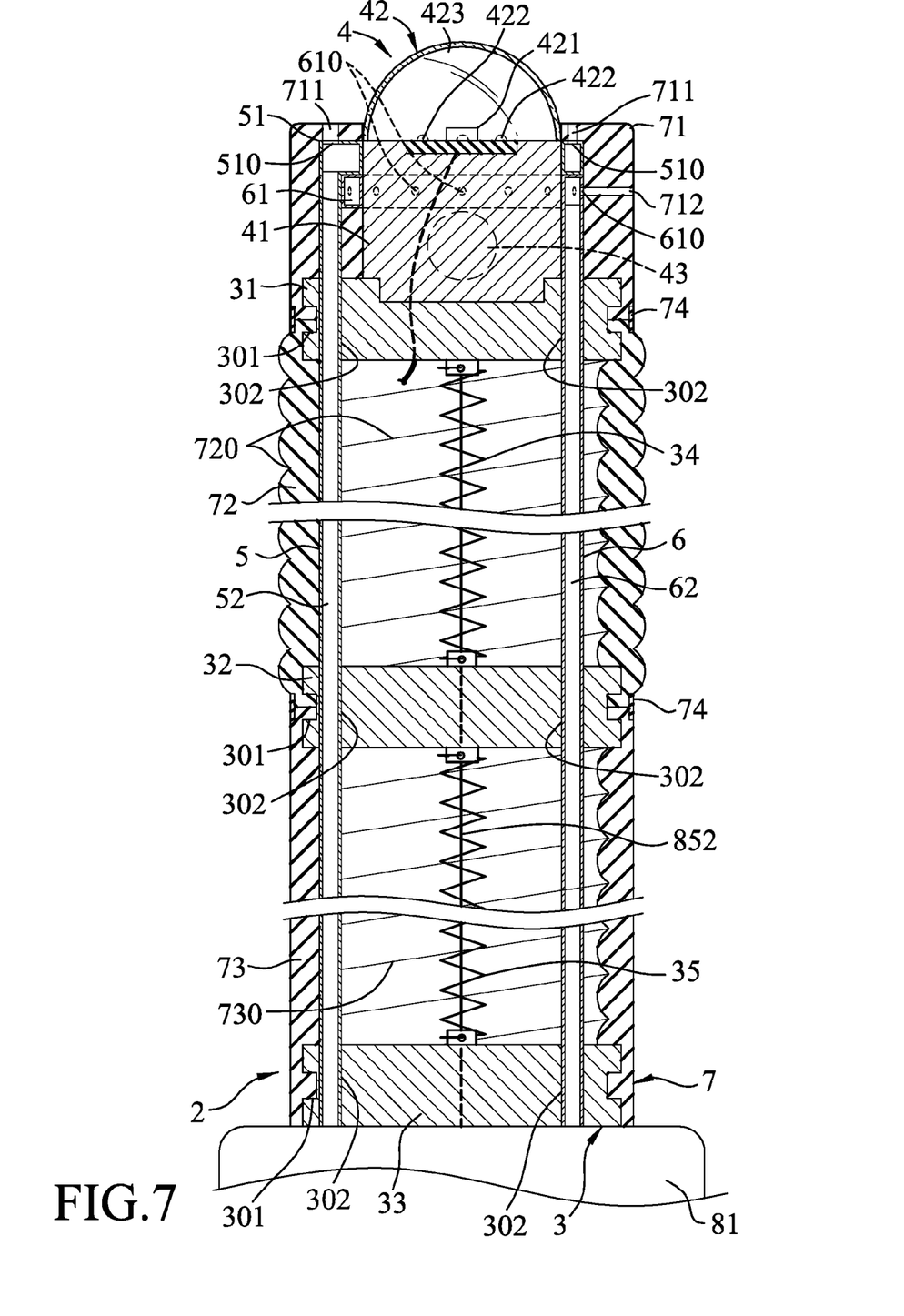
FIG. 7 is a fragmentary sectional side view illustrating the insertion tube device of the embodiment.
Figure 8:
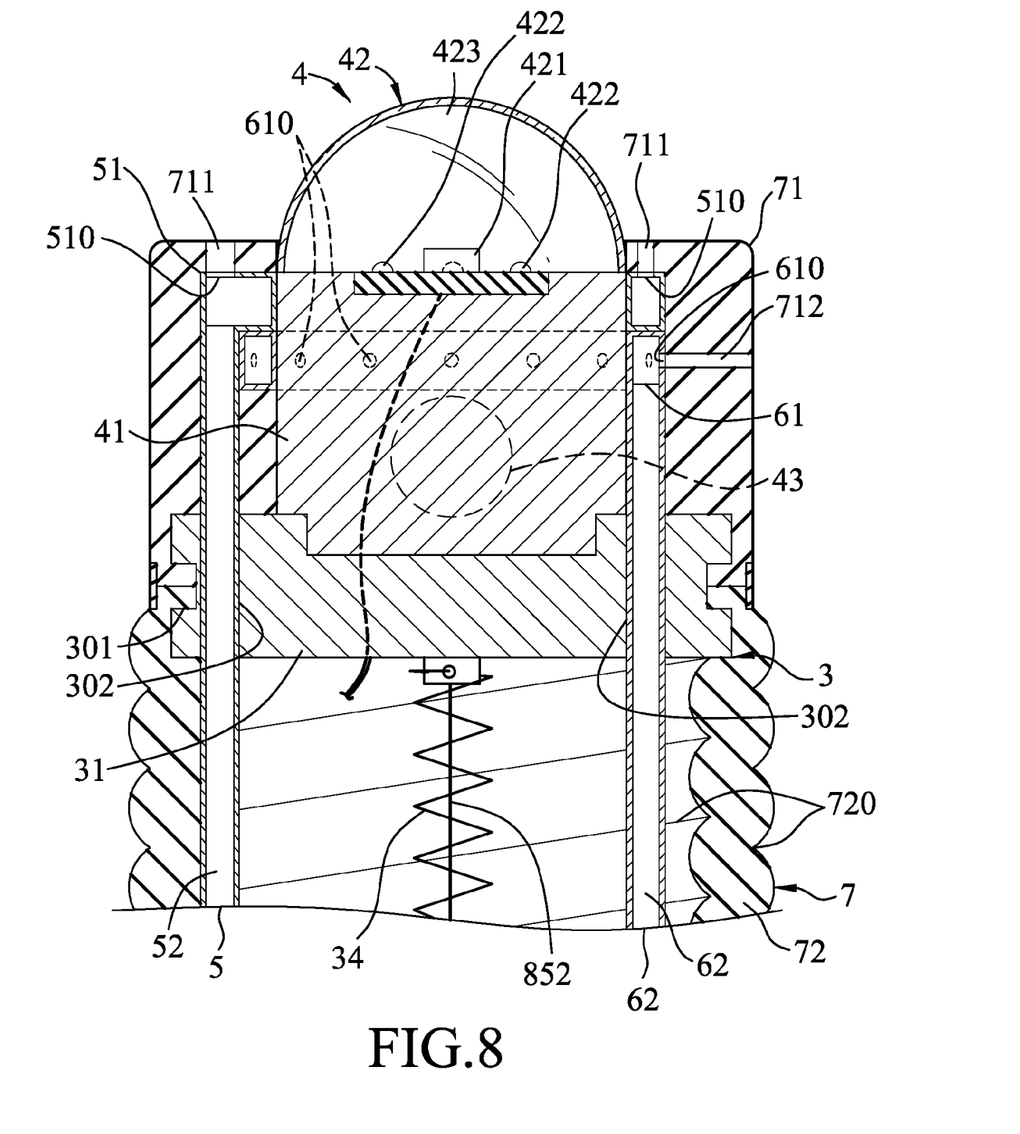
FIG. 8 is a fragmentary enlarged view of FIG. 7.

Referring to FIGS. 4, 6, and 7, the nozzle unit 5 includes a nozzle ring 51 that is sleeved on the lens seat 41, and a first flexible conduit 52 that is fluidly connected to the nozzle ring 51, and that extends through the distal disk 31, the intermediate disk 32, and the proximal disk 33. As shown in FIGS. 4 and 6, the nozzle ring 51 has an annular front surface formed with a plurality of injection holes 510 that are angularly spaced apart from each other. The first flexible conduit 52 extends through one of the conduit passage holes 302 of the distal disk 31, one of the conduit passage holes 302 of the intermediate disk 32, and one of the conduit passage holes 302 of the proximal disk 33, and is connected to the control device 8 for introducing liquid or air provided to the control device 8 into the nozzle ring 51.

The suction unit 6 includes a suction ring 61 that is sleeved on the lens seat 41, and a second flexible conduit 62 that is fluidly connected to the suction ring 61, and that extends through the distal disk 31, the intermediate disk 32, and the proximal disk 33. As shown in FIGS. 4 and 6, the suction ring 61 has an annular side surface formed with a plurality of suction holes 610 that are angularly spaced apart from each other. The second flexible conduit 62 extends through another one of the conduit passage holes 302 of the distal disk 31, another one of the conduit passage holes 302 of the intermediate disk 32, and another one of the conduit passage holes 302 of the proximal disk 33, and is connected to the control device 8 for introducing the negative-pressure of the control device 8 into the suction ring 61.

Referring to FIGS. 2, 4, 5, and 7, the tubular sleeve unit 7 is flexible and sleeved on the lens seat 41 and the elastic support unit 3. The tubular sleeve unit 7 includes a first silicon tube 71 sleeved on the distal disk 31 and the lens seat 41, a second silicon tube 72 connected to the first silicon tube 71 and sleeved on the distal disk 31 and the intermediate disk 32, a third silicon tube 73 connected to the second silicon tube 72 and sleeved on the intermediate disk 32 and the proximal disk 33, and two silicon gasket rings 74 respectively sleeved on a joint of the first and second silicon tubes 71, 72 and a joint of the second and third silicon tubes 72, 73 for sealing these joints.

Specifically, as shown in FIGS. 3, 5, and 7, the first silicon tube 71 is disposed to cover the nozzle ring 51 and the suction ring 61, and fits into and occupies a half of the circular groove 301 of the distal disk 31. The first silicon tube 71 has a plurality of first through holes 711 respectively and fluidly communicating with the injection holes 510 of the nozzle ring 51, a plurality of second through holes 712 respectively and fluidly communicating with the suction holes 610 of the suction ring 61, and an aperture 713 being registered with the second lens module 43 for allowing the second lens module 43 to capture images through the aperture 713.

The second silicon tube 72 has two opposite ends that respectively fit into the circular grooves 301 of the distal disk 31 and the intermediate disk 32, and that respectively occupy another half of the circular groove 301 of the distal disk 31 and a half of the circular groove 301 of the intermediate disk 32. The second silicon tube 72 further has two spiral grooves 720 respectively formed on inner and outer surfaces of the second silicon tube 72 for facilitating bending thereof. In other embodiments, the second silicon tube 72 may have only one spiral groove 720 that is formed on one of the inner and outer surfaces of the second silicon tube 72.

The third silicon tube 73 has two opposite ends that respectively fits into the circular grooves 301 of the intermediate disk 32 and the proximal disk 33, and that respectively occupy another half of the circular groove 301 of the intermediate disk 32 and the circular groove 301 of the proximal disk 33. The third silicon tube 73 further has a spiral groove 730 formed on an inner surface of the third silicon tube 73 for facilitating bending thereof.

Figure 9:
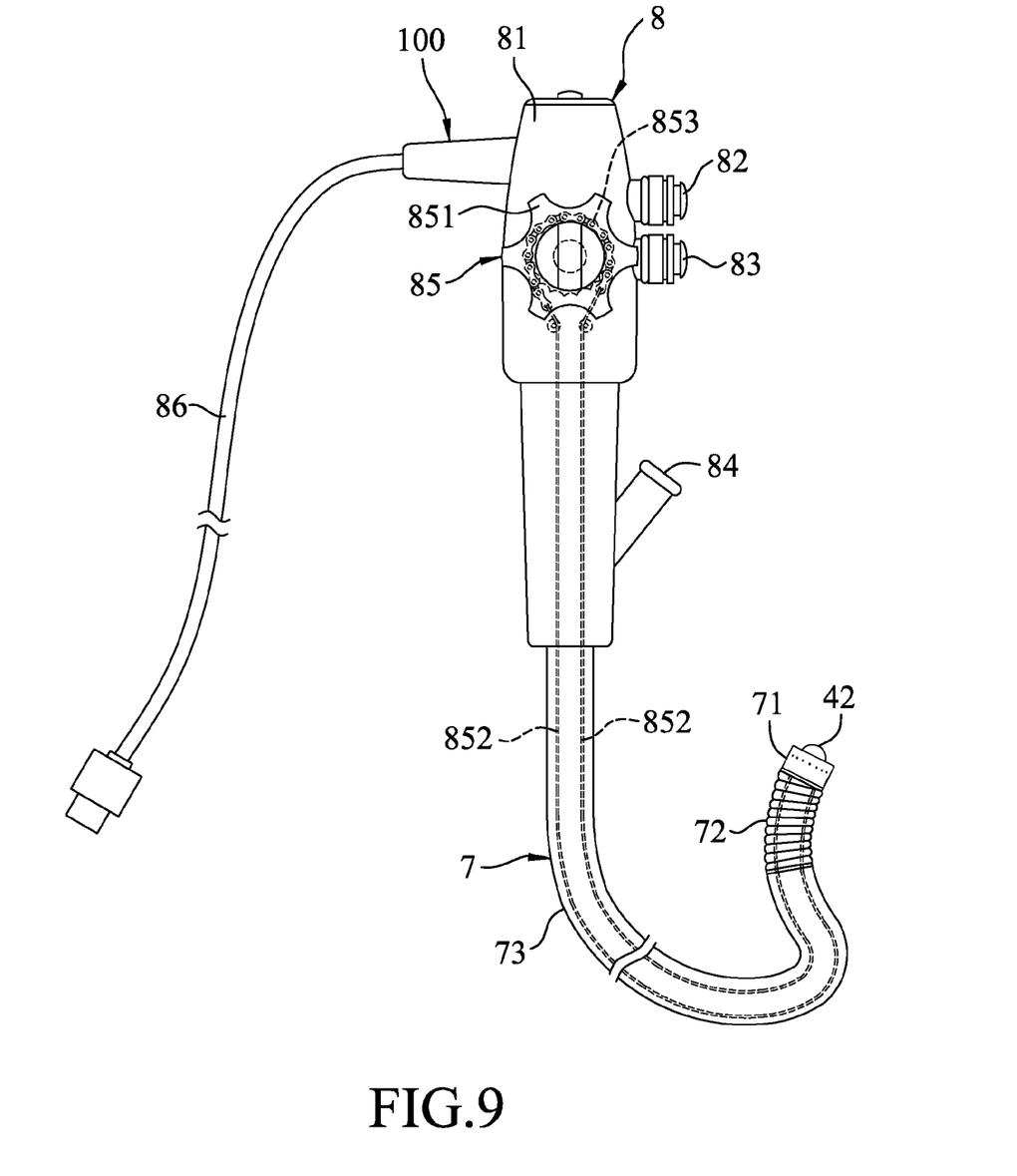
FIG. 9 is a fragmentary side view illustrating an angulation control module of a control device of the embodiment.

Referring further to FIGS. 1, 5, and 9, the control device 8 includes a grip 81 that is connected to the proximal disk 33 of the elastic support unit 3, a liquid valve 82 and an air valve 83 that are mounted on the grip 81 and that are fluidly connected to the first flexible conduit 52, a suction valve 84 that is mounted on the grip 81 and that is fluidly connected to the second flexible conduit 62, an angulation control module 85 that is installed on the grip 81 and that is connected to the insertion tube device 2, and a signal wire module 86 that is mounted on the grip 81.

The liquid valve 82 is adapted to be coupled to a liquid pump (not shown), and is configured to be operable to permit a liquid flow generated by the liquid pump to be introduced into the first flexible conduit 52. The air valve 83 is adapted to be coupled to an air pump (not shown), and is configured to be operable to permit an air flow generated by the air pump to be introduced into the first flexible conduit 52. The suction valve 84 is adapted to be coupled to a negative-pressure source (not shown), and is configured to be operable to permit negative-pressure generated by the negative-pressure source to be introduced into the second flexible conduit 62.

The angulation control module 85 includes a sprocket member 851 that is attached to the grip 81, a chain 853 that is disposed in the grip 81 and that is engaged with the sprocket member 851, and two pull wires 852. One of the pull wires 852 extends through one of the wire passage holes 303 of the intermediate disk 32 and one of the wire passage holes 303 of the proximal disk 33, and has opposite ends respectively connected to one end of the chain 853 and the rear surface 312 of the distal disk 31. The other one of the pull wires 852 extends through another one of the wire passage holes 303 of the intermediate disk 32 and another one of the wire passage holes 303 of the proximal disk 33, and has opposite ends respectively connected to another end of the chain 853 and the rear surface 312 of the distal disk 31. The ends of the pull wires 852 that are connected to the rear surface 312 of the distal disk 31 are respectively disposed at opposite sides of the first spring 34.

The sprocket member 851 is rotatable to pull one of the pull wires 852 while releasing the other one of the pull wires 852 so as to move the distal disk 31 relative to the intermediate disk 32 and to deflect the first spring 34, thereby controlling angle of the distal disk 31 relative to the intermediate disk 32.

The signal wire module 86 is electrically connected to the first and second lens modules 42, 43 and is adapted to be signally connected to an external display device (not shown) for transmitting power to the first and second lens modules 42, 43 and transmitting signal from the first and second lens modules 42, 43 to the display device, so that the display device is capable of displaying the images captured by the first and second lens modules 42, 43.

Figure 10:
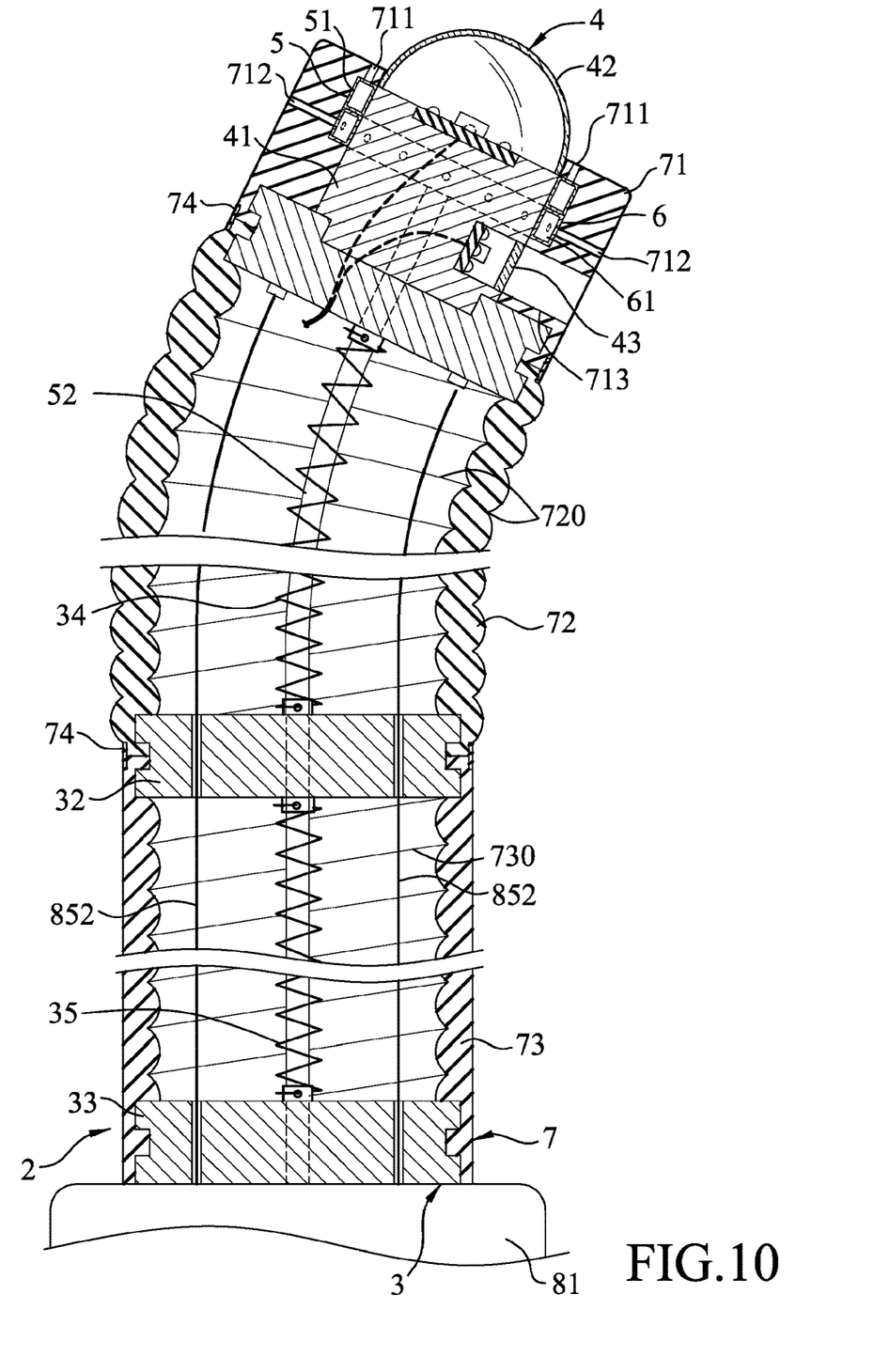
FIG. 10 is a view similar to FIG. 7, but illustrating the embodiment in which the insertion tube device is driven by the angulation control module and is deflected.

Referring to FIGS. 5, 9, and 10, in use, the endoscope 100 of the disclosure can be used in the same manner as a conventional endoscope. Particularly, the insertion tube device 2 is inserted into an internal cavity of a patient, so that the first lens module 42 is able to capture front view images along an insertion direction of the insertion tube device 2, and so that the second lens module 43 is able to capture side view images along a lateral direction of the insertion tube device 2. By virtue that the third silicon tube 73 is formed with the spiral groove 730, while the insertion tube device 2 is inserted, the third silicon tube 73 is easy to bend along a form of the internal cavity of the patient, such as the form of the patient's esophagus or buccal cavity.

As shown in FIGS. 9 and 10, when a user of the endoscope 100 needs to change the image capturing direction of the lens unit 4, the user rotates the sprocket member 851 according to the desired direction so as to control angles of the distal disk 31 and the lens seat 41 relative to the intermediate disk 32, and thereby changes the image capturing direction of the lens unit 4. By virtue that the second silicon tube 72 is formed with the spiral grooves 720 so as to be easy to bend, and by virtue that the elastic coefficient of the first spring 34 is less than that of the second spring 35, when the user controls the image capturing direction of the lens unit 4, the user can easily operate the sprocket member 851 to bend a section of the insertion tube device 2 between the distal disk 31 and the intermediate disk 32, thereby controlling the angle of the distal disk 31 and the lens seat 41 relative to the intermediate disk 32.

When the user wants to rinse tissue in the internal cavity of the patient or the transparent cover member 423, the liquid valve 82 may be opened to introduce a pressurized liquid into the first flexible conduit 52 so that a liquid jet is injected from the injection holes 510 of the nozzle ring 51 through the first through holes 711 of the first silicon tube 71, thereby washing away blood or mucus on the tissue or clean the transparent cover member 423. The air valve 83 may be opened to introduce a pressurized air into the first flexible conduit 52 so that an air flow is injected out from the injection holes 510 of the nozzle ring 51 through the first through holes 711 of the first silicon tube 71, thereby insufflating the internal cavity. The suction valve 84 may be opened to introduce negative-pressure into the second flexible conduit 62 so as to perform body fluid and liquid drainage, as well as air suction through the suction holes 610 of the suction ring 61 and the second through holes 712 of the first silicon tube 71.

In this embodiment, the lens unit 4 is configured to include the first and second lens modules 42, 43, but in other embodiments, the lens unit 4 may include only one of the first and second lens modules 42, 43. For example, the lens unit 4 may only include the first lens module 42. Even in such a configuration, the user still can control the direction of the first lens module 42 as stated above, so as to change the image capturing direction on demand.

In this embodiment, the tubular sleeve unit 7 is configured to include three silicon tubes, i.e., the first, second, and third silicon tubes 71, 72, and 73, but in other embodiments, the tubular sleeve unit 7 may be formed integrally into one elongated silicon tube.

By virtue of the configuration of the endoscope 100 according to the embodiment, the production cost of the endoscope 100 can be reduced significantly. Accordingly, with the lower cost the endoscope 100 can be used as a single-use instrument when it is used for a patient who suffers from a highly communicable disease, without too much cost consideration. Besides, when the endoscope 100 is used for a patient who does not suffer from a highly communicable disease, users can selectively dispose of some components of the endoscope 100 that are intolerant of high-temperature sterilization. For example, after use of the endoscope 100, the tubular sleeve unit 7, the lens unit 4, the nozzle unit 5, and the suction unit 6 may be removed and disposed of, while the elastic support unit 3 may be reused after sterilization. The partially disposable configuration of the endoscope 100 facilitates medical cost reduction.

To sum up, by virtue of the configurations of the elastic support unit 3, the tubular sleeve unit 7, and the lens unit 4, production cost of the endoscope 100 can be significantly reduced without sacrificing its basic functions. Accordingly, the endoscope 100 of the disclosure can be used as a disposable instrument when used for a patient who suffers from a highly communicable disease, thereby reducing infection risk. On the other hand, the endoscope 100 of the disclosure can be used as a partially reusable instrument when used for a patient who does not suffer from a highly communicable disease, thereby further reducing medical cost.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An endoscope (100) comprising:
    an insertion tube device (2) including
        an elastic support unit (3) that includes a distal disk (31), a proximal disk (33), an intermediate disk (32) disposed between said distal disk (31) and said proximal disk (33), a first spring (34) being deflectable and coaxially connected to said distal disk (31) and said intermediate disk (32), and a second spring (35) being deflectable and coaxially connected to said intermediate disk (32) and said proximal disk (33), said distal disk (31), said first spring (34), said intermediate disk (32), said second spring (35), and said proximal disk (33) being arranged coaxially with each other when said first and second springs (34, 35) are not deflected, said distal disk (31) having front and rear surfaces (311, 312), said rear surface (311) of said distal disk (31) facing toward said first spring (34), a lens unit (4) that includes a lens seat (41) mounted on said front surface (311) of said distal disk (31), and a first lens module (42) including a lens mounted on said lens seat (41) for capturing images, and a tubular sleeve unit (7) including a sleeve that is sleeved on said lens seat (41) and said elastic support unit (3); and a control device (8) including a grip (81) that is connected to said proximal disk (33) of said elastic support unit (3), an angulation control (85) that is installed on said grip (81) and that is connected to said insertion tube device (2), and a signal wire module (86) including a wire that is mounted on said grip (81) and that is electrically connected to said first lens module (42) for signal and power transmission, said angulation control (85) being operable to move said distal disk (31) relative to said intermediate disk (32) and to deflect said first spring (34), thereby controlling deflection of said distal disk (31) relative to said intermediate disk (32), wherein said sleeve of said tubular sleeve unit (7) includes a first tube (71) sleeved on said distal disk (31) and said lens seat (41), a second tube (72) connected to said first tube (71) and sleeved on said distal disk (31) and said intermediate disk (32), and a third tube (73) connected to said second tube (72) and sleeved on said intermediate disk (32) and said proximal disk (33), and wherein said second tube (72) has a spiral groove (720) formed on an inner or outer surface thereof for facilitating bending thereof.

2. The endoscope (100) as claimed in claim 1, wherein said third tube (73) has a spiral groove (730) formed on an inner surface thereof for facilitating bending thereof.

3. The endoscope (100) as claimed in claim 1, wherein said tubular sleeve unit (7) further includes two silicon gasket rings (74) respectively sleeved on a joint space between said first and second tubes (71, 72) and a joint space between said second and third tubes (72, 73).

4. The endoscope (100) as claimed in claim 1, wherein said lens of said first lens module (42) includes a front lens (421) for capturing front view images, and a plurality of front illumination members (422) disposed around said front lens (421).

5. The endoscope (100) as claimed in claim 4, wherein said first lens module (42) further includes a transparent cover member (423) mounted on said lens seat (41) and covering said front lens (421) and said front illumination members (422).

6. The endoscope (100) as claimed in claim 4, wherein:
said lens seat (41) has a front surface (411), a rear surface (412) opposite to said front surface and being in contact with said distal disk (31), and a side surface (413) interconnecting said front and rear surfaces;
said lens unit (4) further includes a second lens module (43) embedded into said lens seat (41) via said side surface (413) of said lens seat (41);
said tubular sleeve unit (7) has an aperture (713) being aligned with said second lens module (43); and
said second lens module (43) includes a side lens (431) for capturing side view images through said aperture (713), and a plurality of side illumination members (432) disposed around said side lens (431).

7. The endoscope (100) as claimed in claim 1, wherein:
said insertion tube device (2) further includes a nozzle unit (5) including a nozzle ring (51) that is sleeved on said lens seat (41), and a first flexible conduit (52) that is fluidly connected to said nozzle ring (51), that extends through said distal disk (31), said intermediate disk (32), and said proximal disk (33), and that is connected to said control device (8);

said nozzle ring (51) has an annular front surface formed with a plurality of injection holes (510) that are angularly spaced apart from each other;

said first tube (71) covers said nozzle ring (51) and has a plurality of first through holes (711) respectively and fluidly communicating with said injection holes (510) of said nozzle ring (51); and said control device (8) further includes a liquid valve (82) and an air valve (83) mounted on said grip (81) and fluidly connected to said first flexible conduit (52).

8. The endoscope (100) as claimed in claim 7, wherein:
said insertion tube device (2) further includes a suction unit (6) including a suction ring (61) that is sleeved on said lens seat (41), and a second flexible conduit (62) that is fluidly connected to said suction ring (61), that extends through said distal disk (31), said intermediate disk (32), and said proximal disk (33), and that is connected to said grip (81);

said suction ring (61) has an annular side surface formed with a plurality of suction holes (610) that are angularly spaced apart from each other;

said first tube (71) further covers said suction ring (61) and further has a plurality of second through holes (712) respectively and fluidly communicating with said suction holes (610) of said suction ring (61); and said control device (8) further includes a suction valve (84) mounted on said grip (81) and fluidly connected to said second flexible conduit (62).

9. The endoscope (100) as claimed in claim 8, wherein:
said distal disk (31) has two conduit passage holes (302) that extend parallel to a central axis of said distal disk (31), and that are respectively disposed at opposite sides of said first spring (34);

said intermediate disk (32) has two conduit passage holes (302) that extend parallel to a central axis of said intermediate disk (32), and that are respectively disposed at opposite sides of said first and second springs (34, 35);

said proximal disk (33) has two conduit passage holes (302) that extend parallel to a central axis of said proximal disk (33), and that are respectively disposed at opposite sides of said second spring (35);

said first flexible conduit (52) of said nozzle unit (5) extends through one of said conduit passage holes (302) of said distal disk (31), one of said conduit passage holes (302) of said intermediate disk (32), and one of said conduit passage holes (302) of said proximal disk (33); and said second flexible conduit (62) of said suction unit (6) extends through another one of said conduit passage holes (302) of said distal disk (31), another one of said conduit passage holes (302) of said intermediate disk (32), and another one of said conduit passage holes (302) of said proximal disk (33).

10. The endoscope (100) as claimed in claim 1, wherein:
said intermediate disk (32) has two wire passage holes (303) that extend parallel to a central axis of said intermediate disk (32), and that are respectively disposed at opposite sides of said first and second springs (34, 35);

said proximal disk (33) has two wire passage holes (303) that extend parallel to a central axis of said proximal disk (33), and that are respectively disposed at opposite sides of said second spring (35);

said angulation control (85) includes a sprocket member (851) attached to said grip (81), a chain (853) disposed in said grip (81) and engaged with said sprocket member (851), and two pull wires (852);

one of said pull wires (852) extends through one of said wire passage holes (303) of said intermediate disk (32) and one of said wire passage holes (303) of said proximal disk (33), and has opposite ends respectively connected to one end of said chain (853) and said rear surface (312) of said distal disk (31);

the other one of said pull wires (852) extends through another one of said wire passage holes (303) of said intermediate disk (32) and another one of said wire passage holes (303) of said proximal disk (33), and has opposite ends respectively connected to another end of said chain (853) and said rear surface (312) of said distal disk (31); and said sprocket member (851) is rotatable to pull one of said pull wires (852) while releasing the other one of said pull wires, thereby moving said distal disk (31) relative to said intermediate disk (32) and deflecting said first spring (34).

11. The endoscope (100) as claimed in claim 1, wherein said first spring (34) has an elastic coefficient less than that of said second spring (35).

* * * * *